US006585785B1

(12) United States Patent
Warren et al.

(10) Patent No.: US 6,585,785 B1
(45) Date of Patent: Jul. 1, 2003

(54) FUEL PROCESSOR APPARATUS AND CONTROL SYSTEM

(75) Inventors: David W. Warren, Van Nuys, CA (US); Michael B. Donahue, La Verne, CA (US)

(73) Assignee: Harvest Energy Technology, Inc., Sun Valley, CA (US)

( * ) Notice: Subject to any disclaimer, the term of this patent is extended or adjusted under 35 U.S.C. 154(b) by 384 days.

(21) Appl. No.: 09/696,575

(22) Filed: Oct. 27, 2000

(51) Int. Cl.[7] .................................................. B01J 8/00
(52) U.S. Cl. .......................... 48/127.9; 48/119; 48/123; 48/113; 48/102 A; 422/107; 422/110; 422/111; 422/204; 422/211
(58) Field of Search .......................... 48/62 R, 63, 89, 48/102 A, 113, 119, 123, 127.9, 197 R, 198.3, 198.7, DIG. 10; 422/105, 107, 108, 110, 112, 116, 188, 189, 194, 211, 111, 198, 200, 204

(56) References Cited

U.S. PATENT DOCUMENTS

| 389,900 A | 9/1888 | Pratt et al. |
|---|---|---|
| 2,066,198 A | 12/1936 | Buc |
| 3,672,847 A | 6/1972 | Esselink |
| 4,083,695 A | 4/1978 | Haese et al. |
| 4,238,468 A | * 12/1980 | Bonacci et al. ............. 423/359 |
| 4,692,306 A | 9/1987 | Minet et al. |
| 4,810,472 A | 3/1989 | Andrew et al. |
| 4,863,707 A | * 9/1989 | McShea et al. ............. 423/359 |
| 4,943,493 A | * 7/1990 | Vartanian ..................... 429/17 |
| 4,988,283 A | * 1/1991 | Nagasawa et al. ............ 429/17 |
| 5,382,271 A | 1/1995 | Ng et al. |
| 5,658,681 A | * 8/1997 | Sato et al. ..................... 429/13 |
| 5,932,181 A | 8/1999 | Kim et al. |
| 5,938,800 A | 8/1999 | Verrill |

FOREIGN PATENT DOCUMENTS

| JP | 61101969 A | * 5/1986 |
|---|---|---|
| JP | 01265462 A | * 10/1989 |

* cited by examiner

Primary Examiner—Jerry D. Johnson
Assistant Examiner—Basia Ridley
(74) Attorney, Agent, or Firm—William W. Haefliger

(57) ABSTRACT

A fuel processor apparatus comprising a catalytic tubular reactor is heated using an infrared radiant burner to provide the endothermic heat of reaction needed to reform a mixture of hydrocarbon and steam for the production of a hydrogen-rich gas stream. The hydrogen-rich gas stream is further purified using a sequence of catalytic steps that is fed to a fuel cell whereupon a portion of the hydrogen contained in the gas stream is consumed for the production of electricity by electrochemical reaction with oxygen. An unused portion of the purified hydrogen-rich gas stream exits the fuel cell stack and is combusted in the infrared radiant burner. A fuel cell control system rapidly responds to a variable fuel cell electric demand by adjusting the feed of hydrocarbon to the catalytic tubular reactor to maintain the surface temperature of the infrared radiant burner within defined limits.

18 Claims, 2 Drawing Sheets

FUEL PROCESSOR APPARATUS AND CONTROL SYSTEM

BACKGROUND OF THE INVENTION

Figure 1:
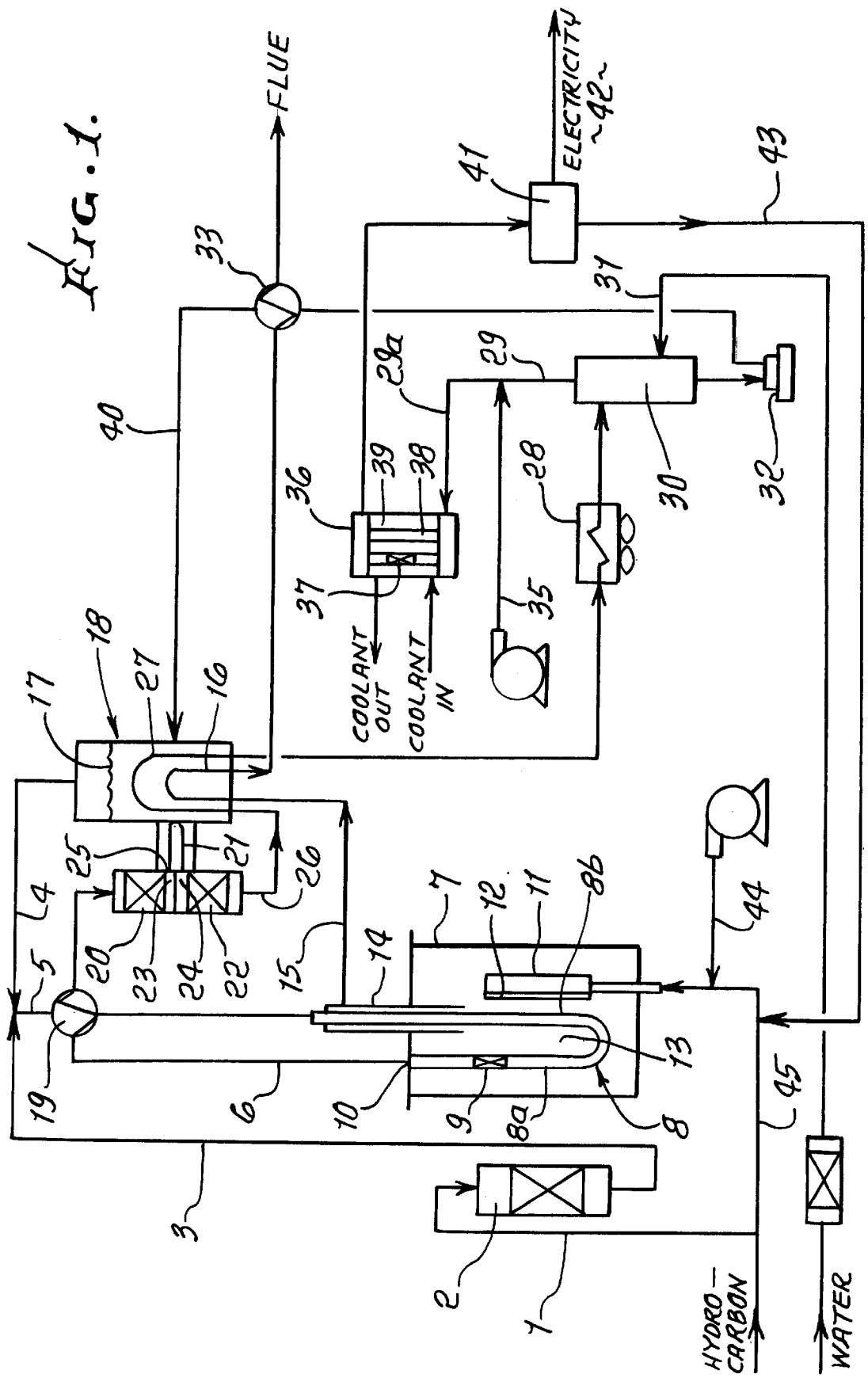

This invention relates generally to operation of a catalytic tubular reactor to reform a mixture of hydrocarbon and steam to produce hydrogen for consumption in a fuel cell; and more particularly concerns maintenance of the temperature of a reactor burner surface temperature within defined limits, by use of a control responsive to fuel cell load changes to control hydrocarbon feed to the fuel cell.

Proton exchange membrane (PEM) fuel cells have emerged as a viable option for the production of disbursed electrical power, typically in the range of 1–50 kW, for use in residential and small commercial applications. PEM fuel cells generate electricity by the electrochemical reaction between hydrogen and oxygen. While oxygen is readily available from ambient air, hydrogen must be produced from commercially available fuels, such as natural gas or propane, using methods such as steam reforming. Steam reforming is a process that involves a high temperature catalytic reaction between a hydrocarbon and steam to form a hydrogen-rich product gas that contains significant quantities of carbon monoxide.

Because PEM fuel cells have a low tolerance to carbon monoxide, typically less than 10 ppm, additional processing steps are required to prepare a hydrogen-rich gas stream that is suitable for use in a PEM fuel cell. These additional steps typically include application of one or more stages of water-gas shift reaction that ultimately reduce the carbon monoxide concentration to less than 10,000 ppm, and a selective oxidation reaction step that further reduces the carbon monoxide concentration to less than 10 ppm. The physical embodiment of the process equipment that achieves the combination of reaction steps needed to convert the hydrocarbon feed to a useful hydrogen product is commonly referred to as a fuel processor.

As an illustration, Table 1 summarizes the reaction steps of a fuel processor designed to produce a hydrogen-rich gas stream suitable for use in a PEM fuel cell.

Table 1. PEM fuel processor reactions steps

| | | |
|---|---|---|
| 1. | $CH_4 + H_2O = CO + 3 H_2$ | Steam reforming |
| 2. | $CO + H_2O = CO_2 + H_2$ | water-gas shift |
| 3. | $CO + \frac{1}{2} O_2 = CO_2$ | Selective oxidation |

Methods to generate hydrogen from hydrocarbon fuels for industrial purposes using the combination of steam reforming and water-gas shift reaction steps are generally known in the prior art. However, industrial hydrogen generators generally do not require a capability for rapid changes in the hydrogen generation capacity. It is desirable that the PEM fuel cell deliver electricity upon demand and thus the fuel processor must be capable of delivering variable quantities of hydrogen to the PEM fuel cell stack in accordance with the electric load requirements, which can change rapidly.

SUMMARY OF THE INVENTION

The present invention concerns provision of a compact fuel processor comprising a catalytic tubular reactor that is heated using an infrared radiant burner to provide the endothermic heat of reaction needed to reform a mixture of hydrocarbon and steam for the production of a hydrogen-rich gas stream. The hydrogen-rich gas stream is further purified using a sequence of catalytic steps and is fed to a fuel cell whereupon a portion of the hydrogen contained in the gas stream is consumed for the production of electricity by electrochemical reaction with oxygen. An unused portion of the purified hydrogen-rich gas stream exits the fuel cell stack and is combusted in the infrared radiant burner. A fuel cell control rapidly responds to a variable fuel cell electric demand by adjusting the feed of hydrocarbon to the catalytic tubular reactor to maintain the surface temperature of the infrared radiant burner within defined limits.

DRAWING DESCRIPTION

Figure 2:
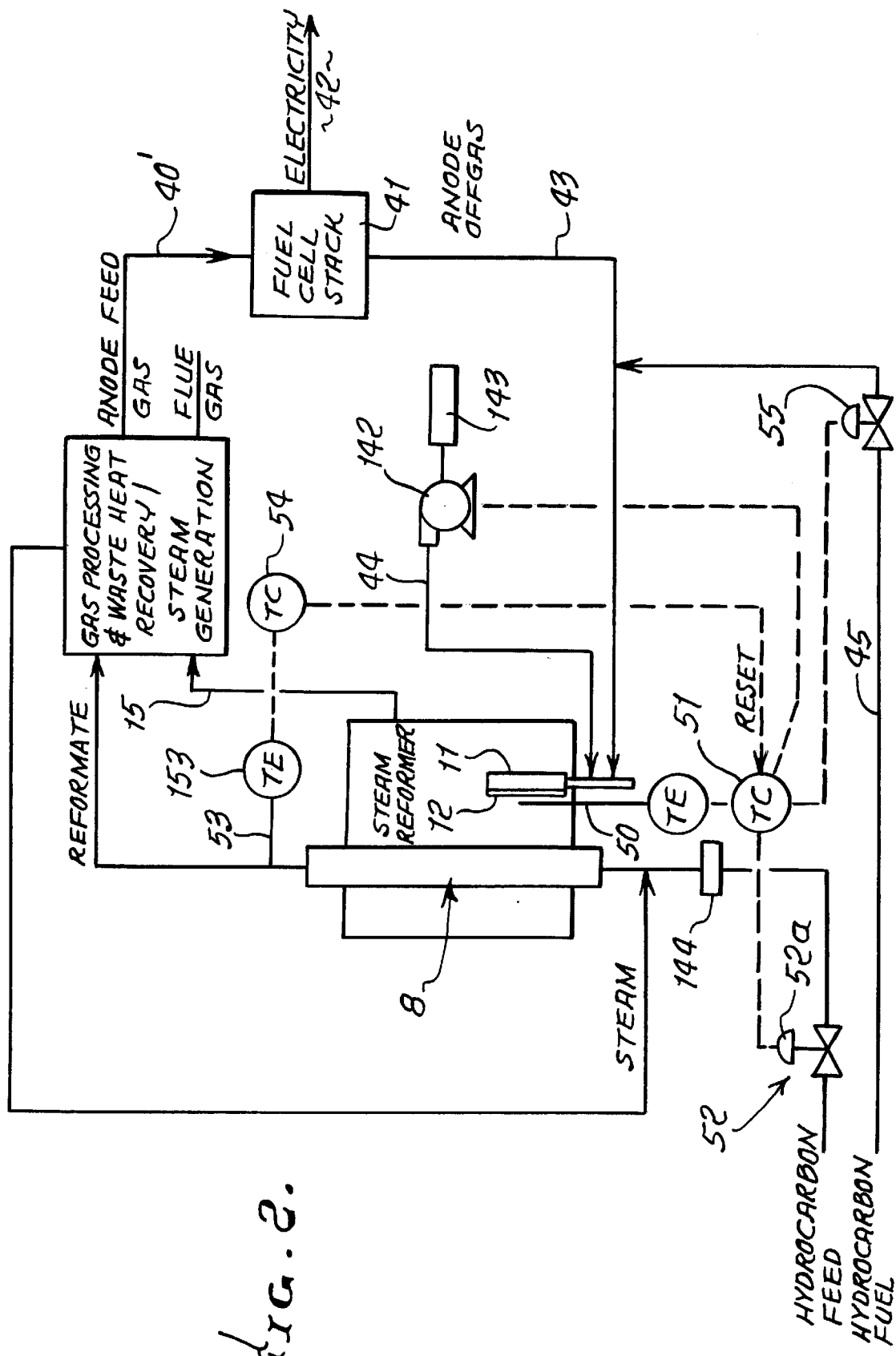

FIG. 1 is a diagram showing the overall process flow scheme of the fuel processing system; and FIG. 2 is a diagram showing the preferred embodiment of the feed control scheme.

DETAILED DESCRIPTION

The process flow embodiment of the present invention achieves the object of generating from a hydrocarbon feed a hydrogen-rich gas stream having quality suitable for use in the generation of electricity in a PEM fuel cell stack.

Referring to FIG. 1, a hydrocarbon feed 1 such as natural gas or propane, is fed to a desulfurizer 2 containing a copper impregnated activated carbon absorbent wherein odorants, such as mercaptans, contained within the hydrocarbon feed are absorbed to produce an essentially sulfur-free feed gas output 3. Desulfurization of the hydrocarbon feed prevents contamination of downstream catalytic processes necessary for the production of the hydrogen-rich gas stream.

The desulfurized feed 3 is mixed with steam 4 and the feed/steam mixture 5 is preheated by heat exchange at 19 against hot reformate 6 that exits from the steam reformer 7. The steam reformer comprises a tubular reactor 8 containing a catalyst 9. The catalyst is commercially available and typically contains an active nickel component that is well known in the art to promote the reaction between hydrocarbon and steam to produce a hydrogen-rich gas stream, or reformate, by a process commonly referred to as steam reforming.

A high degree of conversion of the hydrocarbon feed is achieved by heating the reformate to a temperature in the range of 1200° F. to 1300° F. at the exit 10 of the tubular reactor. The temperature of the reformate at the exit of the steam reformer is typically selected so that the methane concentration in the dry gas is less than about 2% by volume.

The endothermic heat of reaction within the tubular reactor is supplied by combusting fuel and air in an infrared radiant burner 11. A primary portion of the endothermic heat of reaction is transferred by radiation from the burner face 12 to leg sections 8a and 8b of the tubular reactor that are located within the radiant chamber 13. A secondary portion of the endothermic heat of reaction is transferred by convection from the flue gases contained within the annular space defined between an outer flue gas conduit 14 and leg 8b the tubular reactor. The flue gases 15 exiting the steam reformer are sent to a flue gas waste heat recovery coil 16 in communication with water 17 contained in a steam generator 18 wherein heat is recovered to generate steam that is delivered at 4 for use in the process.

The hot reformate 6 exiting the steam reformer is cooled to a temperature of about 600° F. to 650° F. by heat exchange against the feed/steam mixture 5 in a feed/effluent heat exchanger 19. The cooled gas mixture enters an integrated reaction that comprises a high temperature shift reactor 20, an intercooler coil 21 and a low temperature shift reactor 22. The high temperature shift reactor contains a commercially available catalyst, which typically includes the active elements iron and chromium, and that promotes a reaction between steam and carbon monoxide, commonly known as the water-gas shift, to produce hydrogen and carbon dioxide. See reaction 2. in Table 1.

The high temperature shift effluent gases at 23 pass into the intercooler coil 21 that is in heat transfer communication with water contained in the steam generator 18 wherein the effluent gases are cooled to a temperature range of about 400° F.–460° F. before entering the inlet 24 to the low temperature shift reactor. A portion of the high temperature shift reactor shell 25 is also in heat transfer communication with water contained in the steam generator, which serves to remove a portion of the exothermic heat of reaction occurring within the high temperature shift reactor so that the temperature of the gases at the exit 23 is typically in the range of 600° F.–650° F.

The low temperature shift reactor 22 contains a commercially available catalyst, which typically includes the active elements of copper and zinc, and that further promotes water-gas shift reaction at lower temperatures so as to produce a hydrogen-rich gas stream at the exit containing less than about 1% carbon monoxide by volume. The low temperature shift effluent gases 26 enter an after cooler coil 27 within 18, and wherein the gases are further cooled.

After exiting the aftercooler coil, the hydrogen-rich gas stream is cooled to a temperature range of 90° F.–170° F. in an air-cooled heat exchanger 28 resulting in the condensation of a portion of the water contained within the gas stream. The condensed water is separated from the dry gas stream 29 in a separator vessel 30 wherein it is combined with makeup water 31 and returned at 40 to the steam generator using a boiler feedwater pump 32, and after being preheated by heat exchange against flue gases in a boiler feedwater preheater 33.

The dry gas stream 29 exiting the separator vessel is then mixed with a metered quantity of air 35 before being sent at 29a to a selective oxidizer reactor 36. The selective oxidizer reactor contains a catalyst 37 that is packed within the tubes 38 of a water-cooled heat exchanger 39. The catalyst contains platinum and other specialized promoters to selectively combine oxygen with carbon monoxide to produce carbon dioxide even in the presence of a high concentration of hydrogen. See reaction 3. in Table 1. The catalyst has an optimum operating temperature in the range of 120° F. to 200° F. Since the oxidation reaction is highly exothermic, the heat of reaction is removed by passing a liquid coolant such as water over the surfaces of the catalyst-packed tubes. The concentration of carbon monoxide in the anode feed gas 40' at the exit of the selective oxidizer is typically less than 10 ppm.

The anode feed gas exiting the selective oxidizer is of a quality suitable for feed to a PEM fuel cell stack 41 for the production of electricity 42 by electrochemical reaction between oxygen and a portion of the hydrogen contained in the anode feed gas. The unused portion of the anode feed gas, referred to as the anode offgas 43, is sent to the infrared radiant burner 11 of the steam reformer 7 wherein it is combusted with air 44 to provide the endothermic heat of reaction for the production of reformate within the tubular reactor of the steam reformer. The anode offgas may be supplemented with auxiliary hydrocarbon fuel 45 before being sent to the radiant burner.

As the auxiliary hydrocarbon fuel rate is increased, the amount of anode offgas needed to maintain a given radiant burner setpoint temperature decreases. Thus, when the ratio of auxiliary hydrocarbon fuel to hydrocarbon feed is increased, the control system of the present invention will respond by increasing the percentage of hydrogen contained in the anode feed gas that is consumed in the fuel cell stack. The percentage of hydrogen contained in the anode feed gas that is consumed by the fuel cell stack is commonly referred to as the hydrogen utilization. For instance, if the auxiliary fuel is increased for a given hydrocarbon feed rate, then the hydrogen utilization will increase to reduced the heating value of the anode offgas.

The feed control system of the present invention achieves the object of rapid response to independently varying electric load demand variations at the fuel cell stack.

Referring to FIG. 2, the anode feed gas 40' is sent to a fuel cell stack 41 wherein a portion of the hydrogen contained in the anode feed gas is consumed by electrochemical reaction to produce electricity 42. The unused portion of the anode gas, referred to as the anode offgas 43, is sent to an infrared radiant burner 11 wherein said gas is premixed with air 44 and is ignited on the burner face 12. That burner face may typically comprise a porous material consisting of ceramic or metal fibers. Because the porous surface has a low thermal inertia, the temperature of the burner face responds extremely rapidly to variations in the quantity of anode offgas that is combusted within the infrared radiant burner.

For instance, the burner face temperature can be heated from room temperature to 1600° F. in a period of just a few seconds from the start of fuel flow to the burner. Therefore, the temperature of the burner face provides a rapid measure of the quantity of anode offgas that exists the fuel cells stack.

The quantity of hydrogen contained in the anode feed gas that is consumed in the fuel cell stack is proportional to the quantity of electrical power 42 that is produced in the stack. It is desirable that the fuel cell stack be capable of delivering a varying quantity of electricity as dictated by the system electric load demand. Therefore, it is desirable that the fuel processor automatically responds to the variable electric load demand by producing a proportionately varying quantity of hydrogen that is sent to the fuel cell stack.

To accomplish this objective, a temperature emitter 50 consisting of a thermocouple or infrared thermometer measures the temperature of the burner face. A burner face temperature controller 51 maintains a desired setpoint temperature at the burner face by varying the flow rate of hydrocarbon feed at a flow control valve 52. A valve actuator 52a is responsive to controller 51. The burner face setpoint temperature is typically maintained in the range of 1300° F. to 1900° F.

For instance, if the electric load increases, the quantity of hydrogen consumed in the fuel cell stack increases and the quantity of anode offgas sent to the infrared radiant burner decreases. This results in a rapid reduction in the burner face temperature. The control system of the present invention will respond by increasing the flow rate of hydrocarbon feed as needed to increase the hydrogen production rate and thus the flow of anode offgas that is sent to the infrared burner in order to maintain the desired burner face setpoint temperature.

As the hydrocarbon feed is reduced, the endothermic heat of reforming is also reduced and thus it is necessary to reduce the amount of fuel that is combusted in the reformer to balance the heat requirement of the steam reforming process. Also, a significant portion of the steam that is needed for reforming is generated by recovery of waste heat from the combustion gases that exit the steam reformer. Since it is generally desirable to maintain an approximately constant ratio between hydrocarbon feed and steam at the reformer inlet, the quantity of waste heat that is available form the combustion gases is adjusted as a function of the hydrocarbon feed rate.

Since the radiant burner face temperature is sensitive to the combustion air to fuel ratio, an increase in combustion air will result in or correspond to an increase in the fuel rate for a given radiant burner face setpoint temperature. Thus, by appropriate scaling of the combustion air 44 rate as a function of the hydrocarbon feed rate, the objective of control of the endothermic heat requirement in the reformer and the waste heat requirement for steam generation is accomplished according to the present invention. Control of the combustion air can be accomplished using a control valve, a variable speed combustion air blower or other suitable means, indicated at 142, and controlled at 143 as a function of hydrocarbon feed rate. See for example flow sensor 144.

While adjustment of the combustion air provides a convenient method to approximately balance the heat requirements within the reformer as a function of hydrocarbon feed rate, some fine tuning may be needed to control the reformate exit temperature within certain defined limits. Because the temperature of the radiant burner face varies as a function of the air to fuel ratio, modulation of the burner face set point temperature provides a means to fine-tune the absorbed duty in the tubular reactor.

In the present invention, a temperature emitter 153 monitors at 53 the exit temperature of the reformate exiting that tubular reactor. A tubular reactor exit temperature controller 54 responsive to output of 153 is used to reset the setpoint temperature of the burner face temperature controller 51. For instance, if the tubular reactor gas exit temperature is above the desired setpoint temperature, the tubular reactor exit temperature controller will lower the setpoint temperature of the burner face temperature controller. This results in a reduction in the flow of anode offgas to the infrared burner by modulation of the hydrocarbon feed flow control valve.

As the auxiliary hydrocarbon fuel 45 rate is increased, the amount of anode offgas needed to maintain a given radiant burner setpoint temperature decreases. Thus, when the ratio of auxiliary hydrocarbon fuel to hydrocarbon feed is increased, the control system of the present invention will respond by increasing the percentage of hydrogen contained in the anode feed gas that is consumed in the fuel cell stack. The percentage of hydrogen contained in the anode feed gas that is consumed by the fuel cell stack is commonly referred to as the hydrogen utilization. For instance, if the auxiliary fuel is increased for a given hydrocarbon feed rate, then the hydrogen utilization will increase to reduce the heating value of the anode offgas. Thus, by appropriate scaling of the auxiliary hydrocarbon fuel 45 rate as a function of the hydrocarbon feed rate using a fuel control valve 55, the objective of control of the hydrogen utilization rate in the fuel cell stack is accomplished according to the present invention.

The control system of the present invention provides a means and method for rapidly modulating the production of hydrogen fed to a fuel cell stack in response to rapid changes in the electric load demand. The present invention also provides means and method to balance the endothermic heat requirements in the reformer and the waste heat requirements for steam generation as a function of load. The present invention further provides a means and method for trim control to maintain a nearly constant temperature at the exit of the tubular reactor over wide load variations. The present invention additionally provides a means and method for control of the hydrogen utilization in the fuel cell stack.

We claim:

1. A fuel processor apparatus comprising in combination a catalytic tubular reactor and an infrared radiant burner operated to heat the reactor, and to provide the endothermic heat of reaction needed to reform a mixture of hydrocarbon and steam supplied to the reactor for the production of a hydrogen-rich gas stream fed to a fuel cell, and including a control responsive to temperature change of the burner, which in turn responds to variation in fuel cell electric load, to adjust the feed of hydrocarbon to the catalytic tubular reactor.

2. The combination of claim 1, wherein the tubular reactor is disposed within a combustion chamber and is packed with a catalyst employed for the conversion of hydrocarbon to industrial gases by reaction with steam; said tubular reactor having an upper portion that is surrounded by a convection chamber to enhance the transfer of heat from combustion products to the reactor.

3. The combination of claim 2, wherein the radiant burner temperature is monitored by said control which includes a process controller that adjusts a metering valve for hydrocarbon feed to the reactor.

4. The combination of claim 3, wherein the radiant burner has a temperature setpoint controlled as a function of the effluent temperature of a steam reformer that incorporates said burner and reactor.

5. The combination of claim 2, wherein combustion air is supplied to the burner and is proportioned by the control as a function of the hydrocarbon feed rate thereby to control the amount of said endothermic heat.

6. The combination of claim 2, wherein combustion air is supplied to the reactor and is proportioned as a function of the hydrocarbon feed rate to control the amount of waste heat that is used to generate steam and thus maintain a generally constant steam to hydrocarbon feed ratio in the reactor.

7. The combination of claim 2, including a delivery means that delivers combustion products from the combustion chamber to a waste heat boiler to generate steam.

8. The combination of claim 1, wherein the burner is a radiant metal fiber burner disposed within a combustion chamber, said radiant burner having a gas permeable zone that promotes the flameless combustion of fuel and oxidant in order to heat the metal fiber to incandescence and radiate thermal energy to the reactor.

9. The combination of claim 1, wherein the fuel cell produces anode offgas fed to the radiant burner.

10. The combination of claim 9 wherein auxiliary hydrocarbon fuel is mixed with said anode offgas that is fed to the radiant burner.

11. The combination of claim 10, wherein said auxiliary hydrocarbon fuel is proportioned by the control to be fed as a function of the hydrocarbon feed rate to control the hydrogen utilization in the fuel cell.

12. The combination of claim 1, including a high temperature water-gas shift reactor; and wherein reformate produced by the catalytic tubular reactor is cooled in a feed/product heat exchanger to achieve an inlet temperature in the range of 550° F. to 700° F. to said high temperature water-gas shift reactor.

13. The combination of claim 12 including a low temperature water-gas shift reactor, and wherein the effluent from the high temperature water-gas shift reactor is cooled to achieve an inlet temperature of 375° F. to 500° F. to said low temperature water-gas shift reactor by transfer of heat in a waste heat boiler to generate steam.

14. The combination of claim 13, wherein the effluent from the low temperature water-gas shift reactor is cooled in the waste heat boiler to generate steam.

15. The combination of claim 14, including a separator, and wherein said effluent from the waste heat boiler, is further cooled in an air cooler to recover water in said separator.

16. The combination of claim 15, including a selective oxidizer, and wherein said effluent from the air cooler and the separator, is mixed with a small quantity of air before being sent to the selective oxidizer to reduce the CO concentration in the effluent from the air cooler to less than 10 ppm.

17. The combination of claim 16, wherein the optimum temperature of the selective oxidizer is in the range of 120° F. to 200° F.

18. The combination of claim 1, wherein selective oxidizer effluent is sent to the fuel cell anode offgas is sent to the radiant burner to supply said endothermic heat of reaction.

* * * * *